United States Patent [19]
Do

[11] Patent Number: 5,191,198
[45] Date of Patent: Mar. 2, 1993

[54] GIMBAL CARD READER

[75] Inventor: Cuong D. Do, Los Angeles, Calif.

[73] Assignee: Transaction Technology, Inc., Santa Monica, Calif.

[21] Appl. No.: 673,360

[22] Filed: Mar. 22, 1991

[51] Int. Cl.⁵ .................. G06K 13/00; G06K 13/06
[52] U.S. Cl. .................. 235/483; 235/449; 235/482; 360/2
[58] Field of Search ............ 235/483, 435, 449, 482, 235/486, 475; 360/2, 105, 109

[56] References Cited

U.S. PATENT DOCUMENTS

| | | | |
|---|---|---|---|
| 3,940,796 | 2/1976 | Haun et al. | 235/482 |
| 4,040,108 | 8/1977 | Nakata | 360/2 |
| 4,110,803 | 8/1978 | Townsend | 235/449 |
| 4,529,872 | 7/1985 | Dinges | 235/483 |
| 4,581,523 | 4/1986 | Okuno | 235/449 |
| 4,616,128 | 10/1986 | Case | 360/2 |
| 4,628,386 | 12/1986 | Chabrolle | 360/2 |
| 4,806,744 | 2/1989 | Briane et al. | 235/449 |
| 4,910,394 | 3/1990 | Ohta | 235/449 |
| 4,922,086 | 5/1990 | Milford | 235/449 |

FOREIGN PATENT DOCUMENTS 0392532 10/1990 European Pat. Off. ............ 235/449
0191313 8/1989 Japan ........................ 360/2

Primary Examiner—Eugene R. LaRoche
Assistant Examiner—Tan Nguyen
Attorney, Agent, or Firm—Charles H. Schwartz; Ellsworth R. Roston

[57] ABSTRACT

A card reader for reading data recorded on a magnetic stripe on a card includes a guide for guiding the card along a path past a transducer head. A gimbal arrangement mounts the head on the end of a mounting shaft which is journaled in the end of an arm for free rotation about an axis parallel to the stripe as it moves along the path. The arm swivels about a transverse axis perpendicular to the stripe and is biased to bring the head into the guide path through a head opening. The head has a leading bevelled surface so that a card inserted in the path will lift the head which will then ride firmly on the stripe. By virtue of the free rotation of the head about an axis parallel to the stripe, the device adjusts for any lack of parallelism between the head and the magnetic stripe.

21 Claims, 3 Drawing Sheets

GIMBAL CARD READER

BACKGROUND OF THE INVENTION

1. Field of the Invention

This invention relates to credit card readers and, more particularly, to credit card readers having improved gimbal type mounting of the transducing head.

2. Brief Description of the Prior Art

Credit cards and banking cards are usually provided with a data carrying magnetic stripe in which the card information is magnetically recorded. Three types of card readers are in common use: a swipping reader, a dip reader and a transport reader. In a dip reader, the card is dipped into a slot, while in a transport reader, the card is pulled mechanically through a long slot. In all situations, it is desirable to have a good close contact between the magnetic head of the reader and the magnetic stripe carried by the card which requires that head be able to follow and adjust to the less than flat contours of the card which may be warped beyond the international standards for cards. It has been found that small changes in the distance between the magnetic head and the magnetic stripe result in large changes in the reading ability of the head. The data read from the stripe may therefore be inaccurate.

In order to avoid this problem, it is desirable to maintain the head perfectly parallel and in contact with the magnetic stripe and to push the head against the magnetic stripe with uniform pressure even when reading across the irregularities of a heavily contoured card.

Prior art magnetic card readers, such as those shown in Townsend U.S. Pat. No. 4,110,803, Chabrolle U.S. Pat. No. 4,628,386, Okuna U.S. Pat. No. 4,581,523, Briane et al U.S. Pat. No. 4,806,744 and Nakata U.S. Pat. No. 4,040,108 teach the use of springs to apply pressure to maintain contact between the head and the magnetic stripe on a card. However, in these devices structural inaccuracies may result in the head being out of parallel with the magnetic stripe on the card. Thus, the aforementioned small changes in the distance between the head and the stripe may still be present to produce reading errors.

SUMMARY OF THE INVENTION

It is the object of the present invention to address the problem of the inaccurate reading of magnetic stripes by misaligned reading heads.

To this end, the present invention contemplates the provision of a card reader in which gimbal means mounts the transducer head on arm means for free rotation about an axis parallel to the magnetic stripe when a card is inserted in card guide means in alignment with the head. By virtue of the free rotation of the head, it adjusts for any lack of parallelism between the head and the magnetic stripe on the card. The arm means is mounted to swivel about a transverse axis perpendicular to the magnetic stripe, and biasing means acts on the arm to maintain the head in firm engagement with the stripe.

The card reader of the invention includes a pair of spaced, parallel guide plates forming the guide path for the card. One of the guide plates has a head aperture, through which the head is biased into engagement with the other guide plate.

The head is mounted on the end of a mounting shaft, the other end of which is journaled in a bearing hole extending longitudinally into the arm means from an end of the arm means. Since the arm means extends parallel to the magnetic stripe of a card inserted in the guide means, the head is free to rotate about an axis parallel to the stripe.

The arm means of the card reader of the invention has a transverse bearing opening for a transverse pivot shaft about which the arm means swivels under the influence of the biasing means. The biasing means comprises a coil spring mounted on a spring mounting pin and pressing against the arms means on one side of the transverse pivot shaft, while the head is mounted on the arm means on the other side of the transverse pivot shaft.

The transducer head has a transducing face with a transverse transducing gap and leading and trailing bevelled surfaces on each side of the gap. When a card is inserted along the guide path, the leading edge of the card engages the leading bevelled surface of the head and lifts the head from contact with the other guide plate allowing the head to ride snugly on the magnetic stripe as the card moves along the guide path.

BRIEF DESCRIPTION OF THE DRAWINGS

These and other objects, features and advantages of the invention will be more fully appreciated with reference to the accompanying figures, in which.

DETAILED DESCRIPTION OF THE PREFERRED EMBODIMENT

Figure 1:
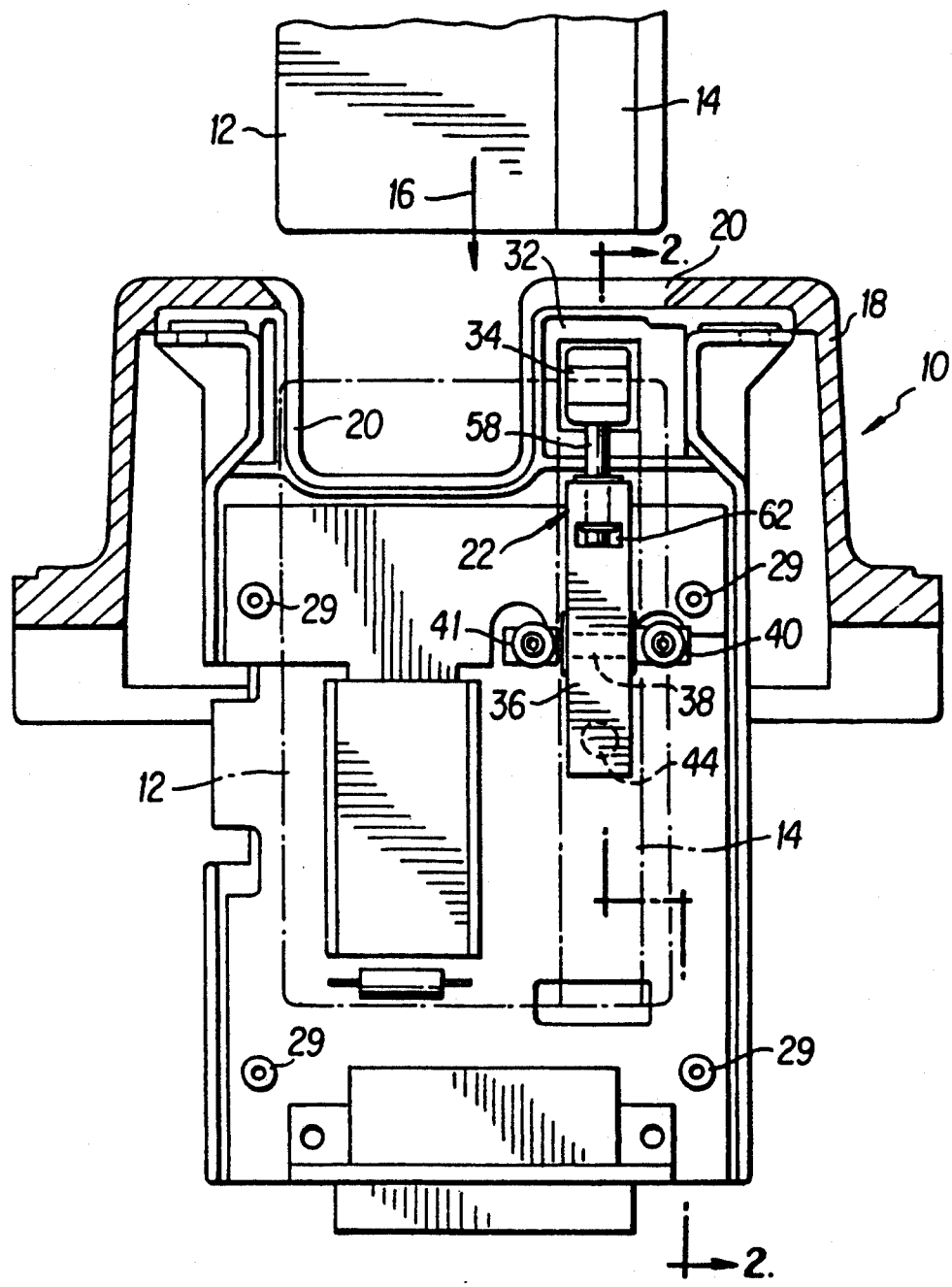
FIG. 1 is a vertical section view of a dip card reader of the invention.

As seen in FIG. 1, a dip card reader 10 of the invention is adapted to receive and read a credit card 12 having a magnetic stripe 14 parallel to a side of the card. Data, such as a credit card number, is recorded in stripe 14 and is read by reader 10 when the card is inserted in the direction 16 to a position within the reader as shown by card 12 in phantom line. The reader includes a housing 18 having a card entry opening 20 through which card 12 is inserted. This moves magnetic stripe 14 past a magnetic transducer head 34 of a transducer head assembly 22. Head 34 reads the data recorded in the stripe.

Card 12 is moved along a guide path 24 (best seen in FIG. 2) formed by spaced, parallel plates 26 and 28 molded from a suitable plastic material. At the bottom of guide path 24, plates 26 and 28 are thicker to abut and form an end abutment 27 for card 12. Plates 26 and 28 are also thicker to abut laterally of guide path 24. As seen in FIG. 1, plates 26 and 28 are bolted together with bolts 29. Guide plate 26 has a transducer head opening 30 through which transducer head is biased into engagement with guide plate 28, as will be explained below. Head opening 30 is reduced somewhat in size by a frame member 32 mounted thereon on the side opposite to guide path 24.

Figure 2:
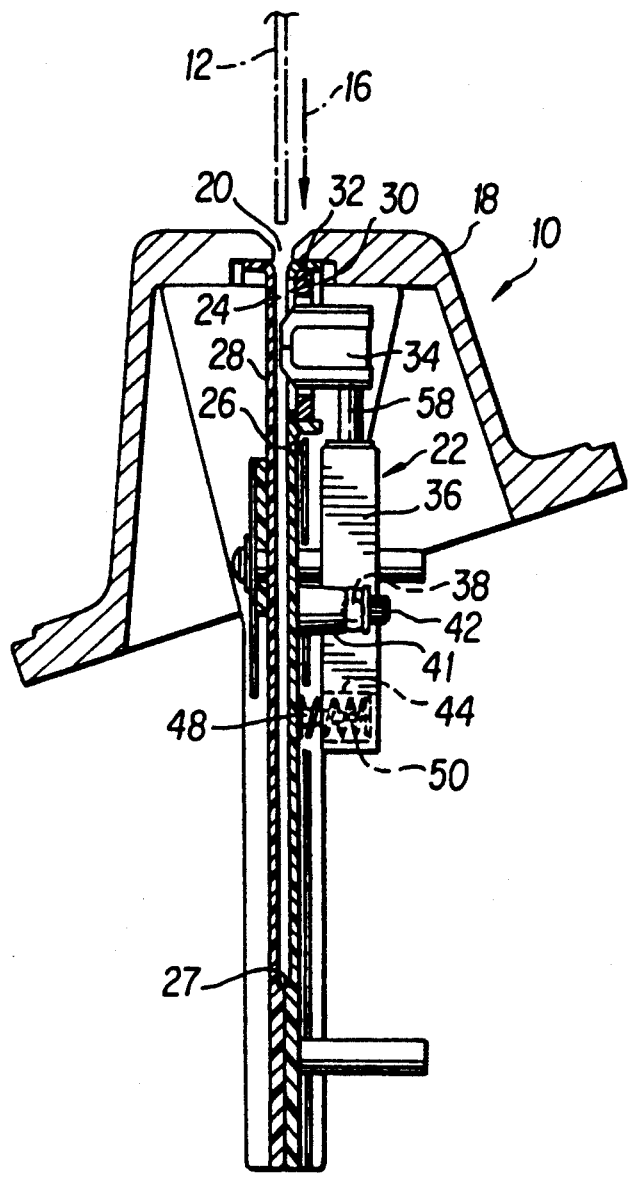
FIG. 2 is a section view along the line 2—2 of FIG. 1.
Figure 3:
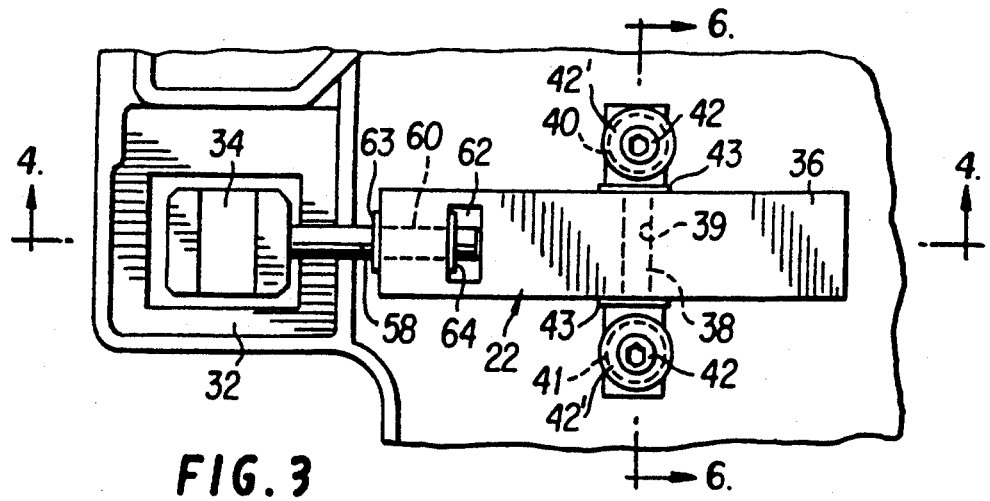
FIG. 3 is a view of the transducer head assembly of a dip card reader of the invention.
Figure 4:
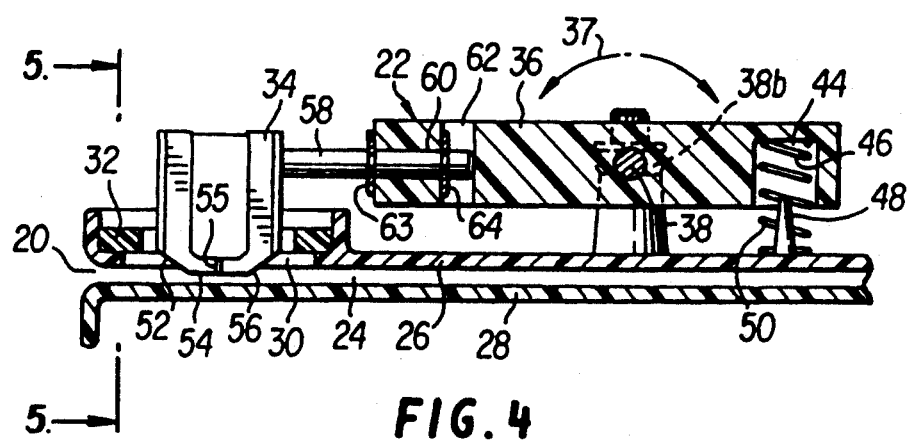
FIG. 4 is a section view along the line 4—4 of FIG. 3.
Figure 5:
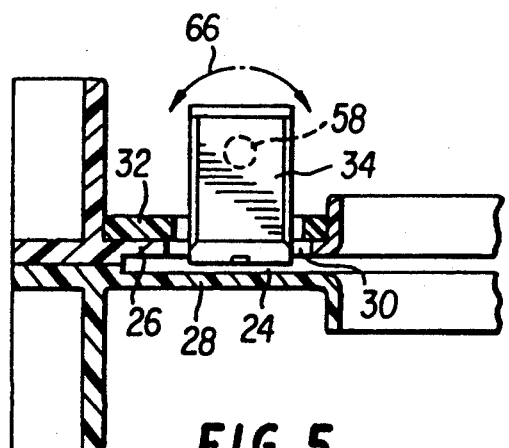
FIG. 5 is a section view along the line 5—5 of FIG. 4.
Figure 6:
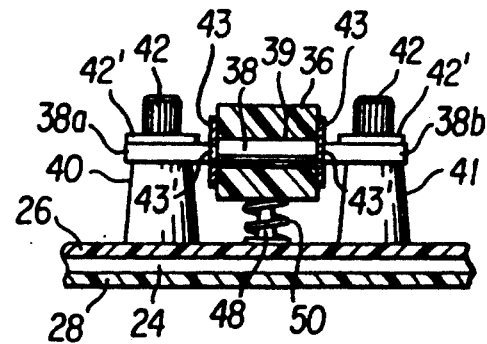
FIG. 6 is a section view along the line 6—6 of FIG. 3.

As already mentioned, transducer head assembly 22 includes a transducer head 34. This head is mounted on a transducer arm 36 which, as indicated by arrow 37 in FIG. 4, is journaled to pivot on a shaft 38 extending through a transverse bore 39. Shaft 38 is mounted between posts 40 and 41. As best seen in FIGS. 2, 4 and 6, ends 38a and 38b of shaft 38 have flat surfaces parallel to plates 26 and 28. A flat surface of shaft end 38a rests on the flat top of post 40, and a flat surface of shaft end 38b rests on the flat top of post 41. Shaft 38 is fixed in place by a pair of screws 42 extending through ends 38a and 38b and threaded in posts 40 and 41. The top flat surfaces of ends 38a and 38b are engaged by washers 42' held in place by the heads of screws 42. Arm 36 is held in position on shaft 38 by C-shaped clips 43 set in grooves 43' provided in shaft 38 between shaft ends 38a and 38b and transducer arm 36.

In order to bias transducer head 34 through head opening 30 into engagement with guide plate 28, a recess 44 is provided rearward of shaft 38 in the side of transducer arm 36 facing guide plate 26. A conical post 48 extends from guide plate 26 towards recess 44, and a coil spring 50 is mounted on post 48 and extends into recess 44. The force applied by coil spring 50 on the upper inner surface of recess 44 causes arm 36 to pivot about shaft 38 to move head 34 through head opening 30 into engagement with guide plate 28.

As seen in FIGS. 2 and 4, transducer head 34 has a leading bevelled surface 52 extending at an angle from a transducing surface 54 which, when transducer head 34 is in its operating position, extends generally parallel to guide plates 26 and 28. With head 34 so positioned, leading surface 52 extends transversely to guide path 24 so that a card 12 inserted into guide path 24 will have a leading edge which engages leading bevelled surface 52 of head 34 to lift head 34 from engagement with guide plate 28 to permit card 12 to move across and in close proximity to transducing surface 54. A transducing gap 55 is positioned midway across transducing surface 54 and extends transversely of guide path 24 when head 34 is in its operating position. To ease the withdrawal of card 12, head 34 has a trailing bevelled surface 56 extending at an angle from transducing surface 54 and also extending transversely to guide path 24.

As seen in FIG. 1-5, head 34 is mounted on a forward end of a mounting shaft 58 which, at its trailing end, is journaled in bore 60 extending through arm 36 from its forward end to an opening 62 which extends through arm 36 in a direction perpendicular to guide plates 26 and 28. Shaft 58 is locked in place in bore 60 by C-clips 63 and 64 which are seated in grooves (not seen) provided in the surface of shaft 58 respectively adjacent the forward end of arm 36 and the forward end of opening 62. By virtue of so mounting head 34 on arm 36, head 34 is free to rotate with shaft 58 about an axis extending longitudinally of arm 36 as indicated by arrow 66 in FIG. 5.

When the dip card reader of the invention is assembled, shaft 58 is rotated until transducing surface 54 faces and is generally parallel to guide path 24. By virtue of the bias provided by spring 50, arm 36 will pivot to bring transducer head 34 through opening 30 into engagement with guide plate 28. The card reader is then ready to receive a card 12.

In the operation of the device, card 12 is inserted through opening 20 into guide path 24 with magnetic stripe 14 in alingment with the position of transducing head 34. As card 12 moves down guide path 24, its leading edge will engage the leading bevelled edge 52 of transducer head 34 to overcome the bias of spring 50 and lift transducing surface 54 off of guide plate 28 by pivoting arm 36 about shaft 38. Card 12 is then free to slide down guide path 24 until its leading edge abuts abutment 27. Since magnetic stripe 14 was in alignment with head 34, transducing face 54 of head 34 will ride over stripe 14 and read the data recorded therein as card 12 is moved along guide path 24. Although irregularities in the card and its movement along the guide path have caused reading errors by introducing variations in the spacing between the magnetic stripe and the transducing surface of the reading head of prior art devices, this problem is avoided by the card reader of the present invention. Since head 34 is free to move toward and away from the magnetic stripe by pivoting about shaft 38 and free to rotate about the longitudinal axis of the arm with shaft 58, it readily accomodates to irregularities in the card and in its movement along guide path 24. As a result, variations in the spacing between magnetic stripe 14 and transducing surface 54 of head 34 are minimized. The head is maintained parallel and in contact with the magnetic stripe and is pushed against the magnetic stripe with uniform pressure. As a result, such reading errors are avoided.

Although the present invention has been described with reference to a dip card reader embodiment in which a card to be read is dipped downwardly into a slot and removed by withdrawing the card upwardly, it will be understood that the principles of the invention are also applicable to card readers of the transport type in which the card is pulled in one direction through a long slot.

While the invention has been particularly shown and described with reference to a preferred embodiment thereof, it will be understood by those skilled in the art that the foregoing and other changes in form and detail may be made therein without departing from the spirit and scope of the invention.

The invention as claimed is:

1. Transducing apparatus, comprising:
   a transducer arm,
   means mounting said transducer arm for pivoting about an axis transverse to said arm;
   means mounting a transducer head on said arm for free rotation about an axis extending longitudinally of said arm;
   guide means positioned to be engaged by a face of said head when said arm pivots about said transverse axis;
   biasing means biasing said arm to pivot about said transverse axis to bring said head into engagement with said guide means;
   wherein said biasing means acts against said arm on one side of said transverse axis and said head is mounted on said arm on the other side of said transverse axis;
   wherein said guide means comprises a first guide plate engaged by said face of said head and a second guide plate parallel to said first guide plate and spaced therefrom to form a guide path for a card to be read by said head, said second guide plate having a head aperture through which said head is movable to engage said first guide plate; and
   wherein said biasing means comprising a coil spring mounted on a side of said second guide plate facing away from said first guide plate and engaging said arm.

2. The apparatus of claim 1, wherein said transducer head has a transducing gap extending across said face transverse to said guide path and a leading bevelled surface on said face transverse to said path, whereby when a card is inserted into said guide path it will have a leading edge which engages said leading bevelled surface to lift said head off said first guide plate to ride in close engagement with a recorded stripe on said card.

3. The apparatus of claim 2, wherein said head has a trailing bevelled surface on said face transverse to said path.

4. The apparatus of claim 1, wherein said biasing means further comprises a post extending from said side of said second guide plate towards said arm, said coil spring being mounted on said post.

5. The apparatus of claim 1, wherein said transverse axis is established by a bearing opening through said arm and a pivot shaft extends through said bearing opening.

6. The apparatus of claim 1, wherein said means mounting said head on said arm comprises a mounting shaft, said head mounted on one end of said shaft, the other end of said shaft being journaled in a bearing hole extending longitudinally into said arm from an end of said arm.

7. The apparatus of claim 1, wherein said guide means guides a card to be read by said transducer head along a guide path and wherein said face of said transducer head has a bevelled surface extending transverse to said guide path, whereby a card inserted into said guide path will have a leading edge which engages said bevelled surface to lift said head off said guide means and ride in close engagement with a recorded stripe on said card.

8. A card reader for reading a signal recorded on a magnetic stripe on a card, comprising:
a transducer head;
guide means for guiding said card along a guide path past said head;
arm means;
gimbal means for mounting said head on said arm means for free rotation about an axis parallel to said stripe when said card is inserted in said guide means with said stripe in alignment with said head and parallel with said guide path, said arm means swivelling about a transverse axis perpendicular to said magnetic stripe;
means biasing said arm to bring said head into said guide path to maintain said head in firm engagement with said stripe when said card is inserted in said guide means;
wherein said biasing means acts against said arm on one side of said transverse axis and said head is mounted on said arm means on the other side of said transverse axis; and
wherein said guide means comprises a first guide plate and a second guide plate parallel to said first guide plate and spaced therefrom to form said guide path, second guide plate having a head aperture through which said head is movable to engage said first guide plate; and
wherein said biasing means comprising a coil spring mounted on a side of said second guide plate facing away from said first guide plate and engaging said arm.

9. The card reader of claim 8, wherein said transducer head has a face with a transducing gap extending across said face transverse to said guide path and a leading bevelled surface on said face transverse to said guide path, whereby when said card is inserted into said guide path it will have a leading edge which engages said leading bevelled surface to lift said head off said first guide plate to ride in close engagement with said stripe on said card.

10. Transducing apparatus, comprising:
a transducer arm,
means mounting said transducer arm for pivoting about an axis transverse to said arm;
means mounting a transducer head on said arm for free rotation about an axis extending longitudinally of said arm;
guide means positioned to be engaged by a face of said head when said arm pivots about said transverse axis;
biasing means biasing said arm to pivot about said transverse axis to bring said head into engagement with said guide means; and
wherein said means mounting said head on said arm comprises a mounting shaft, said head mounted on one end of said shaft, the other end of said shaft being journaled in a bearing hole extending longitudinally into said arm from an end of said arm.

11. The apparatus of claim 10, wherein said biasing means acts against said arm on one side of said transverse axis and said head is mounted on said arm on the other side of said transverse axis.

12. The apparatus of claim 11, wherein said guide means comprises a first guide plate engaged by said face of said head and a second guide plate parallel to said first guide plate and spaced therefrom to form a guide path for a card to be read by said head, said second guide plate having a head aperture through which said head is movable to engage said first guide plate.

13. The apparatus of claim 12, wherein said transducer head has a transducing gap extending across said face transverse to said guide path and a leading bevelled surface on said face transverse to said path, whereby when a card is inserted into said guide path it will have a leading edge which engages said leading bevelled surface to lift said head off said first guide plate to ride in close engagement with a recorded stripe on said card.

14. The apparatus of claim 13, wherein said head has a trailing bevelled surface on said face transverse to said path.

15. The apparatus of claim 12, wherein said biasing means comprising a coil spring mounted on a side of said second guide plate facing away from said first guide plate and engaging said arm.

16. The apparatus of claim 15, wherein said biasing means further comprises a post extending from said side of said second guide plate towards said arm, said coil spring being mounted on said post.

17. The apparatus of claim 10, wherein said guide means guides a card to be read by said transducer head along a guide path and wherein said face of said transducer head has a bevelled surface extending transverse to said guide path, whereby a card inserted into said guide path will have a leading edge which engages said bevelled surface to lift said head off said guide means and ride in close engagement with a recorded stripe on said card.

18. A card reader for reading a signal recorded on a magnetic stripe on a card, comprising:
a transducer head;
guide means for guiding said card along a guide path past said head;
arm means;
gimbal means for mounting said head on said arm means for free rotation about an axis parallel to said stripe when said card is inserted in said guide means with said stripe in alignment with said head and parallel with said guide path, said arm means swivelling about a transverse axis perpendicular to said magnetic stripe;

means biasing said arm to bring said head into said guide path to maintain said head in firm engagement with said stripe when said card is inserted in said guide means; and wherein said gimbal means mounting said head on said arm comprises a mount shaft, said head mounted on one end of said shaft, the other end of said shaft being journaled in a bearing hole extending longitudinally into said arm from an end of said arm.

19. The card reader of claim 18, wherein said biasing means acts against said arm on one side of said transverse axis and said head is mounted on said arm means on the other side of said transverse axis.

20. The card reader of claim 19, wherein said guide means comprises a first guide plate and a second guide plate parallel to said first guide plate and spaced therefrom to form said guide path, second guide plate having a head aperture through which said head is movable to engage said first guide plate.

21. The card reader of claim 20, wherein said transducer head has a face with a transducing gap extending across said face transverse to said guide path and a leading bevelled surface on said face transverse to said guide path, whereby when said card is inserted into said guide path it will have a leading edge which engages said leading bevelled surface to lift said head off said first guide plate to ride in close engagement with said stripe on said card.

* * * * *